United States Patent Office 2,716,083
Patented Aug. 23, 1955

2,716,083
BONDING OF YARNS TO RUBBER

Ernest E. Tallis, Coventry, England, assignor to Courtaulds Limited, London, England, a British company No Drawing. Application August 25, 1950,
Serial No. 181,557

Claims priority, application Great Britain
September 23, 1949

14 Claims. (Cl. 154—136)

This invention relates to the bonding of cellulose yarns, for example regenerated cellulose yarns, to rubber, for example the bonding of regenerated cellulose tyre cords to rubber in the production of automobile tyres.

It is known that the simple substitution in tyre cords of untreated regenerated cellulose for cotton is not practicable owing to the lower degree of bonding obtained. In consequence it is usual to improve the bonding between the regenerated cellulose cord and the rubber, for example by incorporating a bonding agent, such as casein or certain synthetic resins, in the viscose from which the regenerated cellulose yarns are obtained or by applying a bonding agent to the yarns or to the cords or fabrics made from them.

United States Patent No. 2,128,229 describes treating cellulosic tyre cords with an aqueous solution or dispersion of heat-hardening aldehyde resin-forming substances, such as phenolic resins, examples being resorcinol-formaldehyde condensation products.

It is the object of the present invention to improve the bonding of cellulosic yarns to rubber.

According to the present invention a process for the production of a composite article comprising cellulose yarns bonded to rubber includes the step of vulcanising rubber in contact with yarns with which has been incorporated a phenol-aldehyde condensation product having side chains containing an ethylenically unsaturated carbon-carbon linkage.

The present invention also includes a composite article comprising cellulose yarns bonded to rubber wherein the bonding between the yarns and the rubber is improved by means of an adhesive comprising a phenol-aldehyde condensation product having side chains containing an ethylenically unsaturated carbon-carbon linkage.

The phenol-aldehyde condensation products having side chains containing an ethylenically unsaturated carbon-carbon linkage (designated hereafter for convenience as "the condensation products of the invention") may be obtained by condensing any of the following pairs of substances:

(i) A phenol having an unsaturated side chain (for example ortho-allylphenol) and a saturated aldehyde (for example formaldehyde), (ii) A phenol (for example resorcinol) and an unsaturated aldehyde (for example crotonaldehyde), (iii) A phenol having an unsaturated side chain and an unsaturated aldehyde.

Mixtures of the reactants may be used; also mixtures of an unsaturated aldehyde, for example crotonaldehyde with a saturated aldehyde, for example formaldehyde or furfural and also mixtures with other resin-forming substances, for example thiourea, provided that steps are taken to ensure that the final product has side chains containing an ethylenically unsaturated carbon-carbon linkage.

The condensation products of the invention may be incorporated in the yarns in any convenient manner, for example, they may be applied to the surface of the yarns or to cords or fabrics made from them, thus the cellulose yarns, cords or fabrics may be impregnated with an aqueous solution or dispersion of the condensation products of the invention and then dried; further condensation and polymerisation may be effected, if necessary by a separate baking step or the heat treatment during the vulcanisation may be sufficient by itself. After impregnation of the yarns, cords or fabrics with the condensation products of the invention and after hydroextraction, the impregnated materials may be run through a dilute solution of an acid, for example 2 per cent lactic acid solution before drying, so that the further condensation and polymerisation will be effected in presence of an acid catalyst. Alternatively or in addition the condensation products of the invention may be added to the cellulosic spinning solution, for example viscose prior to the extrusion of the viscose into an acid bath to form the yarns. For addition to viscose, condensation products of the invention should be used which have been lightly condensed so that they are soluble in alkali and insoluble in acid.

The process of the present invention may be used if desired in conjunction with other processes for improving the bonding, for example processes using one or more other bonding agents, examples being a permanently-fusible, alkali-soluble condensation product of an aldehyde and a monohydric or dihydric phenol as described in the specification for United States Patent application Serial No. 779,651, now U. S. Patent No. 2,643,207, an alkali-soluble resinous condensation product of a phenol and sulphur as described in United States Patent No. 2,502,406, and casein.

The process of the present invention is applicable to all cellulose yarns and particularly to regenerated cellulose yarns such as those obtained by the viscose process or by stretching and saponifying cellulose acetate yarns.

The present invention is applicable to the production of composite articles of all kinds, such as tyres, conveyor belts or "V" section driving belts, which are made up from cellulose yarns and natural rubber or synthetic rubber, for example synthetic rubbers obtained by polymerising butadiene with other polymerisable compounds such as styrene or acrylonitrile.

The present invention is illustrated by the following examples:

Example 1

15 grams of ortho-allyl phenol were dissolved in 10 cc. of a caustic soda solution containing in each 100 grams of solution 45 grams of caustic soda. 18 cc. of formaldehyde solution containing 38 grams of formaldehyde in each 100 grams of solution were added and the mixture was allowed to stand for 4 days. The thick red viscous oil was neutralised with acetic acid and the oily layer which separated was emulsified with 392 cc. of water. This emulsion was then used to impregnate two skeins A and B of 1180 denier 500 filament high tenacity regenerated cellulose yarn. The skeins were hydroextracted and treated as follows:

Skein A dried at 75° centigrade for 2 hours.

Skein B dried at 75° centigrade for 2 hours and then baked at 140° centigrade for 10 minutes.

These skeins were then used for the construction of tyre cord by twisting two threads having an S twist of 11 turns per inch to produce a cord having a Z twist of 13 turns per inch.

The adhesion to rubber of these cords and of similar cords prepared from a skein of untreated 1180 denier 500 filament high tenacity regenerated cellulose yarn were tested by the following so-called "pull through" test:

A special mould was used to produce test samples each consisting of 3 inches or more of free cord with ¾ inch at one end embedded in a block of rubber ¾ inch long.

The mould consisted of 3 parallel slots each shaped to receive a pair of superposed rubber strips ¾ x 4½ x 3/16 inches having sandwiched between them 8 parallel cords. Each cord was laid across the three slots and fitted in grooves provided between the slots. The slots were so spaced in relation to each other to provide at least 3 inches of free cord for each sample.

The filled mould was subjected to a pressure of 250 lb. per square inch and a temperature of 143° centigrade for 20 minutes. The three blocks joined by the free cord were then removed from the mould, cleared of flashes and cut up to provide 24 test samples.

The test samples were allowed to stand for 24 hours and were then tested on a serimeter. Each sample was pulled at 50 cm. per minute and the force in kilograms required to pull the rubber block off the cord was noted. The average of a number of tests for each type of cord was found. The results were as follows:

|  | Kilograms |
|---|---|
| Cord from untreated yarn | 2.62 |
| Cord from skein A | 3.41 |
| Cord from skein B | 4.18 |

The cord from skein A thus showed a 30 per cent increase in adhesion and the cord from skein B showed a 59 per cent increase in adhesion over the cord from the untreated yarn.

*Example 2*

11 grams of resorcinol and 6 cc. of crotonaldehyde were mixed at 15° to 20° centigrade and 0.18 gram of caustic soda in 4 cc. water added. After standing for 96 hours, 15 grams of the resulting product were dissolved in 400 cc. of boiling water to give a solution having a pH of 7.4. A skein of 1180 denier 500 filament high tenacity regenerated cellulose yarn was impregnated with the solution, hydro-extracted and dried at 75° centigrade for 2 hours. The skein was made into tyre cords by twisting two threads having an S twist of 11 turns per inch to produce a cord having a Z twist of 13 turns per inch.

The adhesion to rubber of the cord from the treated skein and a cord prepared from a skein of untreated 1180 denier 500 filament high tenacity regenerated cellulose yarn were tested as described in Example 1. The results were as follows:

|  | Kilograms |
|---|---|
| Cord from untreated skein | 3.03 |
| Cord from treated skein | 4.76 |

The cord from the treated skein thus showed a 57 per cent increase in adhesion over the cord from untreated yarn.

*Example 3*

16.4 grams of eugenol were added to 10 cc. of 10 N caustic soda and 10 cc. of water. 8 cc. of 40 per cent formaldehyde solution were added and the mixture was warmed until all the eugenol had dissolved. After 45 minutes a crystalline product began to separate. After keeping for 2 days a solid mass of methylol eugenol was obtained. 500 cc. of water were added and the solution was used to impregnate two sets of skeins A and B of 1180 denier 500 filament high tenacity regenerated cellulose yarn. The skeins were centrifuged so that they retained their own weight of solution. The two sets of skeins were treated as follows:

Skeins A dried in moving air at 70° centigrade.
Skeins B dried in moving air at 70° centigrade and then baked at 140° centigrade for 10 minutes.

The skeins were then conditioned at 65 per cent relative humidity and made up into tyre cord by twisting two threads having an S twist of 11 turns per inch to produce a cord having a Z twist of 13 turns per inch.

The adhesion to rubber of the cords prepared from skeins A and B and from skeins C of untreated 1180 denier, 500 filament high tenacity regenerated cellulose yarn were tested by means of the so-called "H" test described by Lyons, Nelson and Conrad in "India Rubber World," volume 114, 1946, pages 213 to 217 and 219.

The characteristic adhesion for the cords were as follows:

|  | Pounds per square inch |
|---|---|
| Cord from skeins A (dried only) | 1075 |
| Cord from skeins B (dried and baked) | 950 |
| Cord from skeins C (untreated) | 665 |

The cords from the treated skeins showed a substantial increase in adhesion over the cords from the untreated skeins.

*Example 4*

15 parts by weight of 4-allyl resorcinol, prepared as described by Hurd, Greengard and Pilgrim in the Journal of the American Chemical Society, volume 52, 1930, page 1700, were added to 14 parts by weight of 10 N caustic soda and 14 parts by weight of crotonaldehyde were added. The mixture was allowed to stand for 12 hours and it was diluted to 400 parts by weight with water. Two sets of skeins A and B of 1180 denier 500 filament high tenacity regenerated cellulose yarn were impregnated in the solution, centrifuged and treated as follows:

Skeins A dried in moving air at 70° centigrade.
Skeins B dried in moving air at 70° centigrade and then baked at 140° for 10 minutes.

The skeins were made up into tyre cord as described in Example 3 and adhesion tests on the cords were determined by the "H" test and compared with cords prepared from untreated skeins C of 1180 denier 500 filament high tenacity regenerated cellulose yarn.

The characteristics adhesion of the cords were found to be as follows:

|  | Pounds per square inch |
|---|---|
| Cord from skeins A (dried only) | 958 |
| Cord from skeins B (dried and baked) | 970 |
| Cord from skeins C (untreated) | 665 |

*Example 5*

13.6 parts by weight of vinyl resorcinol (prepared as described in the Journal of the American Chemical Society, volume 50, 1928, pages 2568 and 2572) were dissolved in 14 parts by weight of 10 N caustic soda and 10 parts by weight of water. 16 parts by weight of 40 per cent formaldehyde solution were added and the reaction was allowed to proceed until the formaldehyde had been used up, the mixture was cooled when necessary. The mixture was then diluted to 500 parts by weight by addition of water. Three sets of skeins D, E and F of 1180 denier 500 filament high tenacity regenerated cellulose yarn were impregnated with the mixture, centrifuged and treated as follows:

Skeins D dried in moving air at 70° centigrade.
Skeins E dried in moving air at 70° centigrade and then baked at 140° centigrade for 10 minutes.
Skeins F ran through a 2 per cent solution of lactic acid in water to cause precipitation of the vinyl resorcinol-formaldehyde condensation product and then dried in moving air at 70° centigrade.

The skeins D, E and F were made up into tyre cords as described in Example 3 and adhesion tests on the cords were determined by the "H" test and were compared with cords prepared from untreated skeins C of 1180 denier, 500 filament high tenacity regenerated cellulose yarn.

The characteristic adhesion of the cords were as follows:

| | Pounds per square inch |
|---|---|
| Cord from skeins C (untreated) | 665 |
| Cord from skeins D (dried only) | 1000 |
| Cord from skeins E (dried and baked) | 1020 |
| Cord from skeins F (treated with lactic acid and dried) | 1130 |

The cords from the three sets of treated skeins showed a substantial increase in adhesion over the cord from the untreated yarn.

*Example 6*

10 grams of vinyl resorcinol were added to 24 cc. of 21 per cent caustic soda solution in a flask and 12 cc. of 40 per cent formaldehyde solution were added, the mixture was cooled during the addition of the formaldehyde solution. The flask was closed and the mixture was shaken until all the solid had disappeared. The mixture was allowed to stand for 5 hours and the solution of dimethylol vinyl resorcinol obtained was added to 25 kg. of viscose for the production of high tenacity yarn, the viscose had been filtered but not de-aerated. After the addition the viscose was evacuated and was extruded and stretched as described in United States patent specification No. 2,192,074 and the yarn was collected in a spinning box in the form of a cake. The cake was washed and soaped with 0.2 per cent soap solution and dried. The yarn was twisted with an S twist of 11 turns per inch and two of these twisted threads were doubled together with a Z twist of 13 turns per inch to produce a cord. The amount of dimethylol vinyl resorcinol added to the viscose gave 0.75 per cent on the yarn produced.

The adhesion to rubber of the cord produced from the viscose with the addition of dimethylol vinyl resorcinol and of a cord produced from viscose without the addition were tested by means of the "H" test.

The characteristic adhesion of the cords were as follows:

| | Pounds per square inch |
|---|---|
| Cord from ordinary viscose | 665 |
| Cord from viscose containing dimethylol vinyl resorcinol | 917 |

A substantial improvement in adhesion of the cord containing dimethylol vinyl resorcinol was thus shown over the adhesion of the cord from ordinary viscose.

What I claim is:

1. A composite article comprising cellulose yarns bonded to vulcanised rubber by means of an adhesive consisting essentially of a phenol-aldehyde condensation product having side chains containing an ethylenically unsaturated carbon-carbon linkage whereby said cellulose yarns are bonded to said rubber.

2. A composite article comprising cellulose yarns bonded to vulcanised rubber by means of an adhesive applied to the surface of said yarns, said adhesive consisting essentially of a phenol-aldehyde condensation product having side chains containing an ethylenically unsaturated carbon-carbon linkage whereby said cellulose yarns are bonded to said rubber.

3. A composite article comprising cellulose yarns bonded to vulcanised rubber, the cellulose yarns containing an adhesive consisting essentially of a phenol-aldehyde condensation product having side chains containing an ethylenically unsaturated carbon-carbon linkage whereby said cellulose yarns are bonded to said rubber.

4. A composite article as claimed in claim 1 wherein the cellulose yarns are viscose rayon yarns.

5. A process for the production of a composite article comprising cellulose yarns bonded to vulcanized rubber which comprises incorporating in the yarns an adhesive consisting essentially of a phenol aldehyde condensation product having side chains containing an ethylenically unsaturated carbon-carbon linkage, placing the yarns in contact with unvulcanized rubber and subjecting the assembly to a vulcanizing temperature.

6. A process for the production of a composite article comprising cellulose yarns bonded to vulcanized rubber which comprises incorporating in the yarns an adhesive consisting essentially of a phenol aldehyde condensation product having side chains containing an ethylenically unsaturated carbon-carbon linkage obtained by condensing a phenol having an unsaturated side chain and a saturated aldehyde, placing the yarns in contact with unvulcanized rubber and subjecting the assembly to a vulcanizing temperature.

7. A process for the production of a composite article comprising cellulose yarns bonded to vulcanized rubber which comprises incorporating in the yarns an adhesive consisting essentially of a phenol aldehyde condensation product having side chains containing an ethylenically unsaturated carbon-carbon linkage obtained by condensing a phenol and an unsaturated aldehyde, placing the yarns in contact with unvulcanized rubber and subjecting the assembly to a vulcanizing temperature.

8. A process for the production of a composite article comprising cellulose yarns bonded to vulcanized rubber which comprises incorporating in the yarns an adhesive consisting essentially of a phenol aldehyde condensation product having side chains containing an ethylenically unsaturated carbon-carbon linkage obtained by condensing a phenol having an unsaturated side chain and an unsaturated aldehyde, placing the yarns in contact with unvulcanized rubber and subjecting the assembly to a vulcanizing temperature.

9. A process for the production of a composite article comprising cellulose yarns bonded to vulcanized rubber which comprises treating the cellulose yarns with a solution of an adhesive consisting essentially of a phenol aldehyde condensation product having side chains containing an ethylenically unsaturated carbon-carbon linkage, drying the yarns so treated, placing the yarns in contact with unvulcanized rubber and subjecting the assembly to a vulcanizing temperature.

10. A process for the production of a composite article comprising viscose rayon yarns bonded to vulcanized rubber which comprises incorporating in the viscose rayon yarns an adhesive consisting essentially of a phenol aldehyde condensation product having side chains containing an ethylenically unsaturated carbon-carbon linkage, placing the yarns in contact with unvulcanized rubber and subjecting the assembly to a vulcanizing temperature.

11. A composite article comprising cellulose yarns bonded to vulcanised rubber by means of an adhesive consisting essentially of a condensation product of a phenol having an unsaturated side chain and an aldehyde whereby said cellulose yarns are bonded to said rubber.

12. A composite article comprising cellulose yarns bonded to vulcanised rubber by means of an adhesive consisting essentially of a condensation product of a phenol and an unsaturated aldehyde whereby said cellulose yarns are bonded to said rubber.

13. A composite article comprising cellulose yarns bonded to vulcanised rubber by means of an adhesive consisting essentially of a condensation product of a phenol having an unsaturated side chain and an unsaturated aldehyde whereby said cellulose yarns are bonded to said rubber.

14. A process for the production of a composite article comprising cellulose yarns bonded to vulcanized rubber which comprises dissolving an adhesive consisting essentially of a phenol aldehyde condensation product having side chains containing an ethylenically unsaturated carbon-carbon linkage in a cellulose spinning solution, and spinning the solution into yarns, placing the adhesive-containing yarns so obtained in contact with unvulcanized rubber and subjecting the assembly to a vulcanizing temperature.

References Cited in the file of this patent

UNITED STATES PATENTS

| | | |
|---|---|---|
| 1,902,257 | Moss | Mar. 21, 1933 |
| 2,006,043 | Dykstra | June 25, 1935 |
| 2,128,229 | Charch et al. | Aug. 30, 1938 |
| 2,224,679 | Hershberger | Dec. 10, 1940 |
| 2,314,701 | Harvey | Mar. 23, 1943 |
| 2,371,870 | Brown et al. | Mar. 20, 1945 |
| 2,399,735 | Harvey | May 7, 1946 |
| 2,425,349 | Schroeder | Aug. 12, 1947 |
| 2,429,397 | Compton et al. | Oct. 21, 1947 |
| 2,497,454 | Illingworth et al. | Feb. 14, 1950 |